United States Patent [19]

Prager et al.

[11] 4,254,601
[45] Mar. 10, 1981

[54] PACKAGING MACHINE HAVING A SLITTER FOR FORMING SLITS IN ENDS OF PACKAGES

[75] Inventors: Edward N. Prager, Cincinnati; Louis E. Burnett, Blanchester, both of Ohio

[73] Assignee: Keebler Company, Elmhurst, Ill.

[21] Appl. No.: 14,376

[22] Filed: Feb. 23, 1979

[51] Int. Cl.³ .................. B65B 61/18; B65B 51/16
[52] U.S. Cl. ........................................ 53/133; 53/552;
53/373; 83/300; 83/337; 83/678; 156/510
[58] Field of Search ................ 53/133, 548, 552, 373,
53/379, 389; 83/300, 337, 678; 156/510, 515,
555, 251, 268

[56] References Cited
U.S. PATENT DOCUMENTS

| | | | |
|---|---|---|---|
| 2,682,306 | 6/1954 | Schriber | 83/346 |
| 2,786,510 | 3/1957 | Humphner | 53/133 X |
| 2,801,439 | 8/1957 | Meares | 83/346 X |
| 3,470,779 | 10/1969 | Niepmann | 83/300 |
| 3,641,857 | 2/1972 | Vande Castle | 83/337 X |
| 3,943,686 | 3/1976 | Crawford et al. | 53/373 |
| 4,147,583 | 4/1979 | Deutschländer | 53/133 X |

Primary Examiner—Horace M. Culver
Attorney, Agent, or Firm—Allegretti, Newitt, Witcoff & McAndrews

[57] ABSTRACT

An improved assembly for forming a plurality of individual packages, containing articles, such as crackers or the like therein. The assembly includes a first roller member and a second roller member which is mounted in cooperative relationship with the first roller member. Each of the roller members includes cooperating members for simultaneously heat sealing, crimping and transversely severing a tubular strip containing the crackers in order to form the individual packages containing the crackers. The improvement includes a slitter member mounted on each of the sealing, crimping and severing members carried by the first roller member. The slitter members slit the film along the end portions. A cooperating element is provided in the sealing and severing member carried by the second roller member for holding the film in place while the slitter member cuts the sealed end portions of each of the packages to provide slits in the packages which penetrate through the outer edges of each of the packages, but not the package interior, in order to provide for easy opening thereof.

5 Claims, 12 Drawing Figures

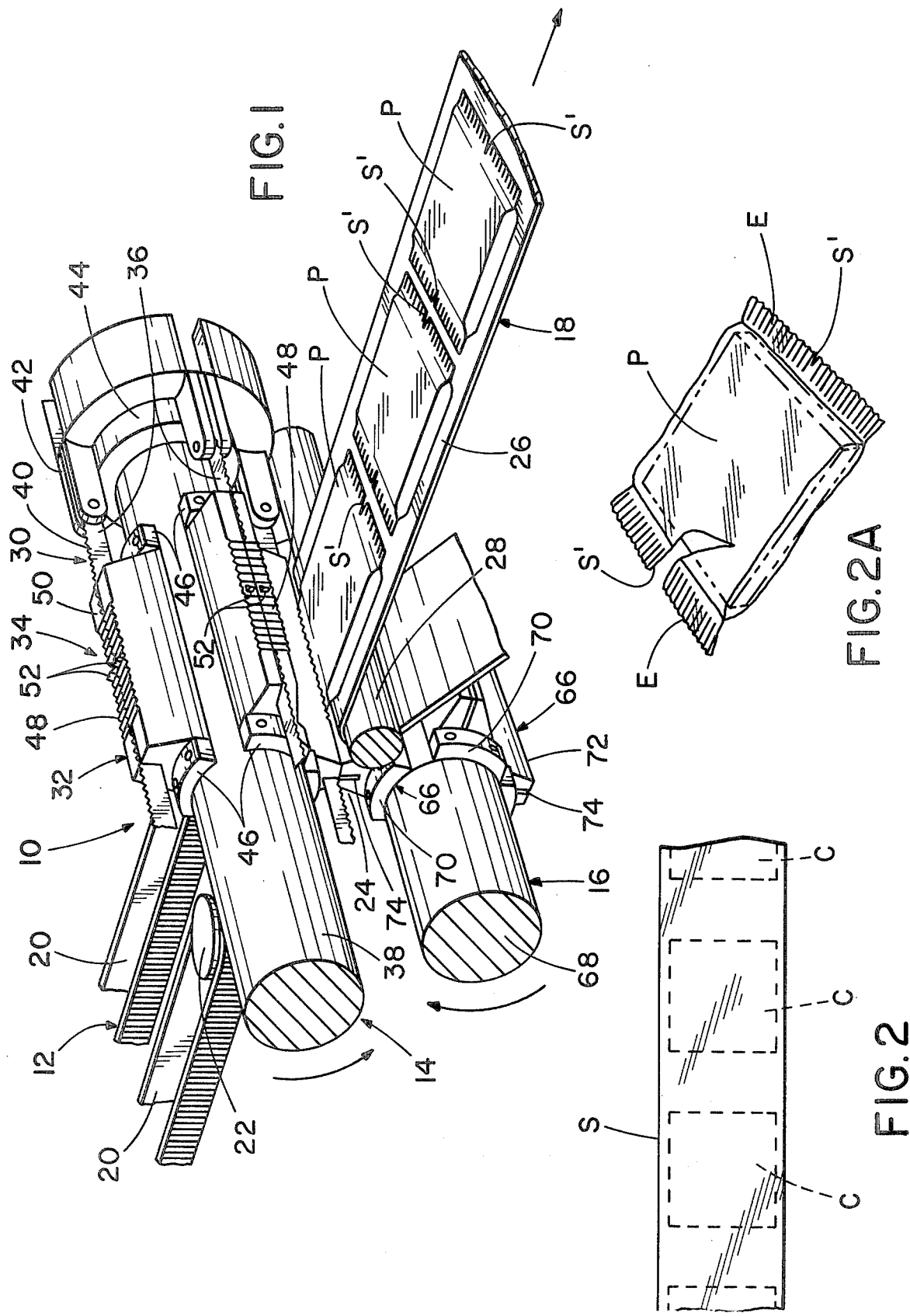

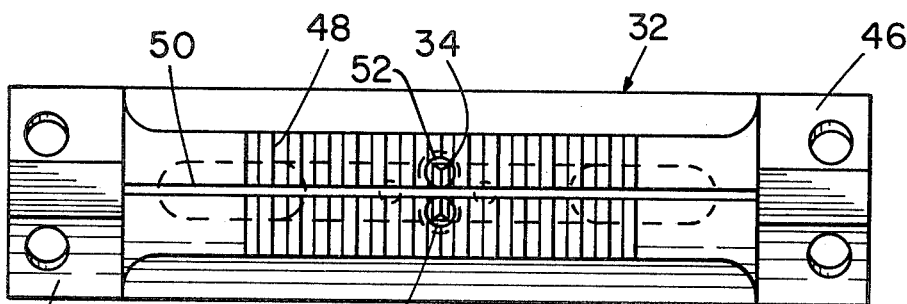
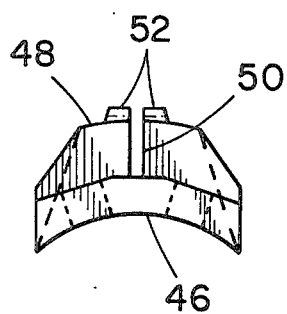
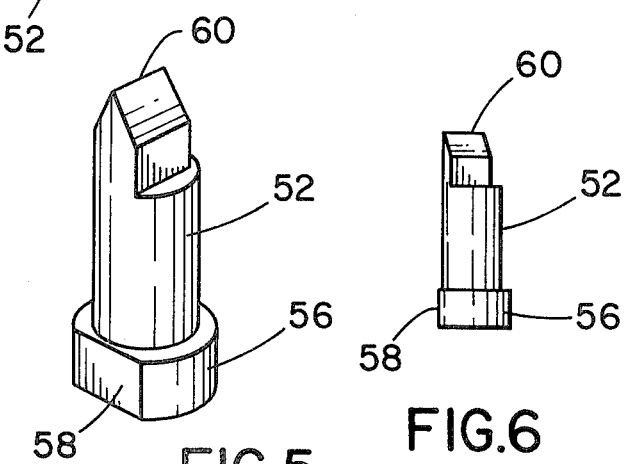
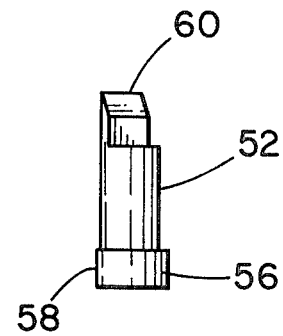
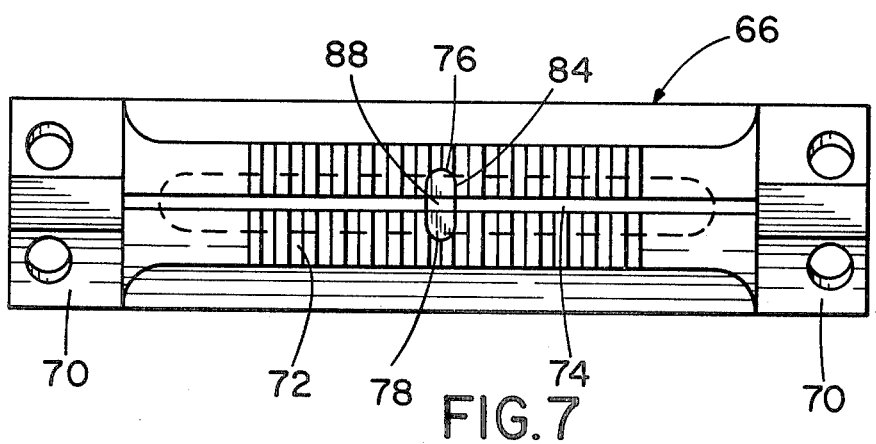
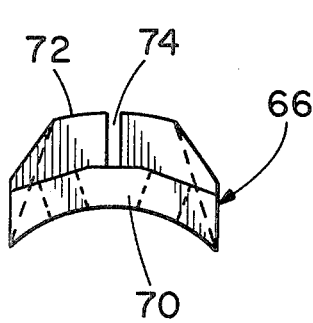
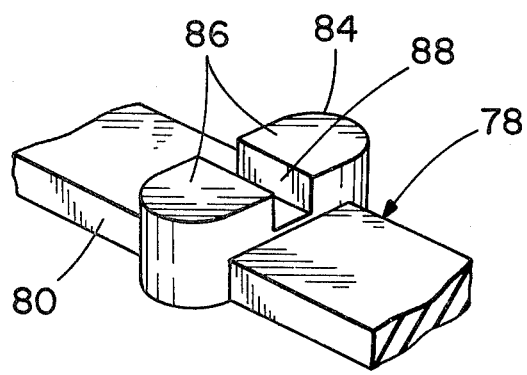

PACKAGING MACHINE HAVING A SLITTER FOR FORMING SLITS IN ENDS OF PACKAGES

BACKGROUND OF THE INVENTION

Field of the Invention and Description of the Prior Art

This invention relates to an improved assembly for dividing a continuous film strip containing a plurality of longitudinally spaced articles into a plurality of individually sealed packages, and it particularly relates to an improved apparatus for forming individual packages for a tubular plastic film wherein the packages contain an individual serving of crackers, cookies or the like and wherein each of the formed packages includes a slit in the outer portion thereof in order to provide for easy opening of the package.

It is common in the food industry, in particular, to package various products in individual packets or packages. Such packets are commonly used to package crackers, cookies, and similar products in individual servings. These packages are generally formed from a tubular plastic film, such as cellophane or polypropylene, and generally contain two crackers or the like therein. The packages are commonly used by restaurants and institutions.

For many years, these packages of crackers or the like were manufactured from cellophane. In the past several years, however, because of increased cellophane prices and questionable future availability, suppliers have converted from the use of cellophane film to polypropylene film in order to wrap the same products. The use of polypropylene, however, has raised various problems, including manufacturing or operational problems and marketing problems. The operational problems included closer heating and cutting tolerances required for polypropylene relative to cellophane.

A significant marketing problem with a polypropylene film package involves the nature of polypropylene film, that is, the polypropylene packages are more difficult to open than cellophane packages to which customers have been accustomed. One of the reasons for the difficulty in opening the polypropylene film packages is that polypropylene has a more narrow heat control range than cellophane and polypropylene tends to "bead" or melt slightly along the cut edge.

One typical machine used for forming packages from cellophane involves a method and apparatus for forming cellophane around the product, such as crackers, in a tubular fashion with the products being longitudinally spaced so that they can be crimped, sealed and cut into separate packages. The machines conventionally used a pair of rollers having heated crimpers thereon, utilizing reciprocal, cam activated hack saw blades, for transversely cutting the tubular strip. In order to solve the problem of opening the polypropylene package, a machine for forming a slit in the outer edge of the package is considered to be highly advantageous.

SUMMARY OF THE INVENTION

It is therefore an important object of the present invention to provide an improved assembly for forming individual packets of product, from plastic film, wherein the assembly forms at least one slit in the outer edge of each package to provide for easy opening of the package.

It is also an object of the present invention to provide an improved apparatus for forming at least one slit through the outer edge of each individual packet of food products, such as crackers, without penetrating the interior of the package, to provide for easy opening thereof, particularly when the packages are made of a plastic which is difficult to open, such as polypropylene.

It is a further object of the present invention to provide an improved assembly for sealing, crimping and severing a tubular plastic strip containing a product, such as crackers, to form an individual package wherein known equipment may be readily adapted to form a transverse slit in the outer edge of the package of plastic film to facilitate opening of the package.

It is still another object of the present invention to provide an improved apparatus for forming an individual package containing crackers or the like wherein the package includes a transverse slit in the outer edge thereof, the apparatus for forming the slit being characterized by its simplicity and economy of construction and manufacture.

Further purposes and objects of the present invention will appear as the specification proceeds.

The foregoing objects are accomplished by providing an improved assembly for dividing a continuous tubular film strip, generally of polypropylene, containing a plurality of longitudinally spaced articles, such as crackers, into a plurality of individually sealed packages containing a selected number of said articles, the assembly including a first roller member, a second roller member mounted in cooperative relationship with the first roller member, cooperating members carried by the first and second roller members for sealing and transversely severing the tubular polypropylene strip at preselected intervals for forming the individual packages, each of the packages including sealed end portions having outer edges, slitter members mounted on the sealing and severing means carried by the first roller member in order to slit the end portions, a cooperating member mounted on the sealing and severing means carried by the second roller member for holding the end portions while the slitter member cuts the end portions, the slitter member and the holding member being constructed and arranged to slit and form at least one slit in at least one of the sealed end portions on each package in a direction transverse and through each of said edges.

BRIEF DESCRIPTION OF THE DRAWINGS

One particular embodiment of the present invention is illustrated in the accompanying drawings wherein:

FIG. 1 is a pictorial view of our improved apparatus for forming a plurality of individual packages containing articles wherein the packages include slits through the outer end portions and edges thereof in order to provide for easy opening;

FIG. 2 is a broken, plan view of a tubular film strip containing the articles to be packaged prior to the sealing and severing of said strip to form individual packages or packets;

FIG. 2A is a pictorial view of a partially opened package made on the apparatus illustrated in FIG. 1;

FIG. 3 is an end elevational view of one sealing and severing member mounted on a roller member and containing slitters for forming slits through the outer edges of the end portions of the package illustrated in FIG. 2A;

FIG. 4 is an end view of the sealing and severing member illustrated in FIG. 3;

FIG. 5 is an enlarged pictorial view of a single slitter member;

FIG. 6 is an end view, reduced in size, of the slitter element embodied in FIG. 5;

FIG. 7 is a top plan view of a severing and sealing member mounted on a second roller member and including an element for holding the film taut while the slitters cut slits in the outer end portions of the package illustrated in FIG. 2A;

FIG. 8 is an end elevational view of the sealing and severing member of FIG. 7;

FIG. 9 is a back up member used in the second roller for the cutting operation provided in the member embodied in FIG. 7;

DETAILED DESCRIPTION OF THE PREFERRED EMBODIMENT

Figure 10:
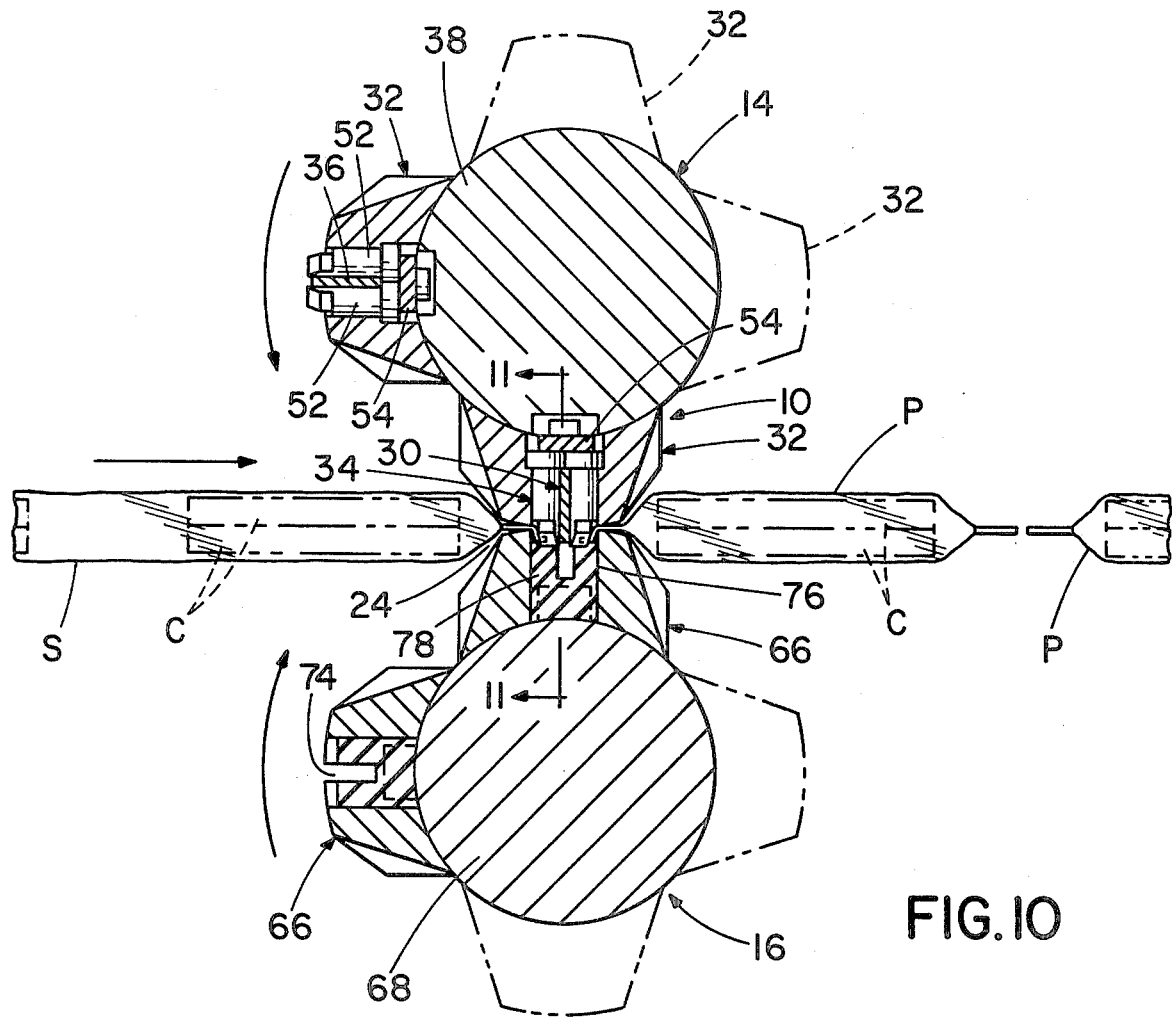
FIG. 10 is a transverse sectional view of the apparatus embodied in FIG. 1 illustrating the sealing, severing and slitting of the tubular film strip in order to form individual packages.

Referring to FIGS. 1, 2, 2A and 10, our improved apparatus, generally 10, for severing, sealing and forming an opening slit in a continuous tubular plastic strip S in order to form a plurality of packages P is shown. Referring to FIGS. 2 and 10, the continuous tubular strip S is generally made of any plastic material that is heat sealable; however, a main purpose of the present invention is to facilitate the ability to open the package P when the strip S is made of a material, such as polypropylene, that is difficult to open. The strip S is tubular in shape and contains a plurality of particles, such as crackers C, which are generally packaged in pairs and which are uniformly spaced in intervals, with the spaces between the crackers C being provided in order that suitable seals and separations into packages may be accomplished.

As seen in FIG. 2A, the package P encloses articles, such as crackers C, in a sealed container having end portions E which have been heat sealed and crimped by the apparatus 10 and which have transverse slots S' centrally of the heat sealed end portions E and penetrating the outer edges of the end portions E, but not penetrating the interior of the package P.

Referring to FIGS. 1 and 10, the apparatus 10 includes an intake conveyor assembly, generally 12, for the strip S, an upper roller assembly, generally 14, a lower roller assembly, generally 16, and an outlet conveyor, generally 18, for carrying the individual packages P for further handling.

The strip intake conveyor 12 is of generally known construction and includes a pair of continuous conveyor belts 20 which face each other and which are in a generally upright position. Each belt 20 passes around an idler roller 22 which is rotatable about an upright axis. The strip S is carried by and between the outer serrated surfaces of the two belts 20 and are carried to the nip area, generally 24, defined between the upper roller assembly 14 and the lower roller assembly 16, as seen best in FIG. 10. The outlet conveyor 18, again, is of generally conventional construction and comprises a continuous horizontal conveyor belt 26 which receives the individual packages P after they are formed from the strip S, after they pass through the nip area 24. The belt 26 moves in the direction indicated by the arrow in FIG. 1 to carry the packages P away from the nip area 24 for packaging. As seen in FIG. 1, the belt 26 passes around an idler roller 28, positioned adjacent the outlet side of the nip area, which is substantially parallel with the upper and lower roller assemblies 14 and 16.

Referring to FIGS. 1 and 2, the upper roller assembly 14 includes a cutter assembly, generally 30, a sealing and crimping block, generally 32 and a slitter assembly, generally 34, which is mounted on the crimper blocks 32. The upper roller assembly 14 is rotatable in a counterclockwise direction and is rotatably mounted in suitable bearings (not shown). A plurality of the cutter assemblies 30 and crimper assemblies 32 may be utilized with each roller assembly; desirably, four such assemblies 30 and 32, equiangularly spaced on the upper roller assembly 14, may be used. Since each cutter assembly 30, crimper assembly 32 and slitter assembly 34 are of the same construction, only one such assembly will be described hereinafter, for purposes of simplicity in description.

The cutter assembly 30 includes a hack saw blade 36 which is mounted for reciprocal radial movement outwardly from the outer surface of the upper roller 38 and is substantially parallel therewith. The outer edge of the blade 36 has a saw tooth edge 40. Since the opposite end of the cutter assembly 30 is substantially of the same construction as that illustrated, only one end of the blade 36 and support assembly is shown for purposes of simplicity. The outer end of the blade 36 is rigidly received by a rigid holder 42, which is radially movable and which is rotatable in unison with the rotation of the upper roller 38.

An arcuate cam 44 is mounted on the outer end of the roller 38 and is fixed relative thereto. The cam 44 cooperates with the blade holder 42 to move the blade 36 radially inwardly and outwardly in order to accomplish the severing or transverse cutting of the tubular strip S as it passes through the nip 24 while having a crimp formed in the package, while being heat sealed, and while having the slit S' formed in the package P.

The sealing and crimper block 32, referring to FIGS. 1, 3, 4 and 10, has an arcuate inner shape so as to be placed against the outer surface of the roller 38 of the upper roller assembly 14. The block 32 is rigidly secured to the roller 38 by bolts (not shown) which pass through openings in opposite flanges 46 at the outer ends of the crimper block 32. The outer or working face or side of the block 32 has a serrated outer surface 48 and includes a longitudinal slot 50 therein which receives the blade 36 for reciprocal cutting motion therein. The blocks 32 are heated to a temperature sufficient to melt the plastic forming the tubular strip S in order to form a heat seal thereof. Suitable electrical connections (not shown) are connected to the crimper blocks 32 in order to heat the blocks 32 to the desired temperature for the heat sealing operation.

Referring to FIGS. 3, 4, 5, 6 and 11, the slitter assembly 34 includes a pair of slitter members 42 rigidly positioned on opposite sides of the slot 50 in the block 36 and in close proximity to the blade 36. As seen best in FIG. 11, a holder 54 secures the slitter members 52 in place in the block 32. As seen in FIG. 5, the slitter member 52 has a lower flange 54 with a flat locking surface 58 thereon for reception in a similarly shaped opening 62 in the block 32. The upper side of the slitter member 52 has a knife edge 60 formed thereon. As seen best in FIG. 11, apertures 62 are provided in the block 32 for receiving the slitter members 52 therethrough. The knife edges 60 project slightly upwardly beyond the upper surface of the serrated portion 48 of the block 32 in order to accomplish the slitting of the sealed end portion E. The holder 54 includes a plate with openings therein and bolts 64 are passed through the openings and are received within threaded apertures within the block 32 in order to hold the slitter elements 52 rigidly in place within the block 32 in the upper roller 38.

Blocks 66 are mounted on a lower roller 68 of the lower roller assembly 16 and are substantially of the same construction as the cam blocks 44. The blocks 66 are rotatably movable into registry with the upper blocks 32. Each block 66 includes opposed securing flanges 70, a serrated outer surface 72, which mates with the serrated surface 48 of the blocks 44, and a central slot 74 which is aligned with the slot 50 in the block 32 to accommodate for the reciprocal movement of the cutting blade 36 therein. The principal difference found in the blocks 66 on the lower roller 68 compared to those on the upper roller is that a central transverse depression or aperture 76 is located opposite the slitter members 52, as seen best in FIGS. 9 and 11. It is preferred to use a back-up member, generally 78, which is preferably made of a plastic material and functions to hold the plastic film of the tubular strip S firmly in place during and for the slitting of the film by the slitter members 52.

Figure 11:
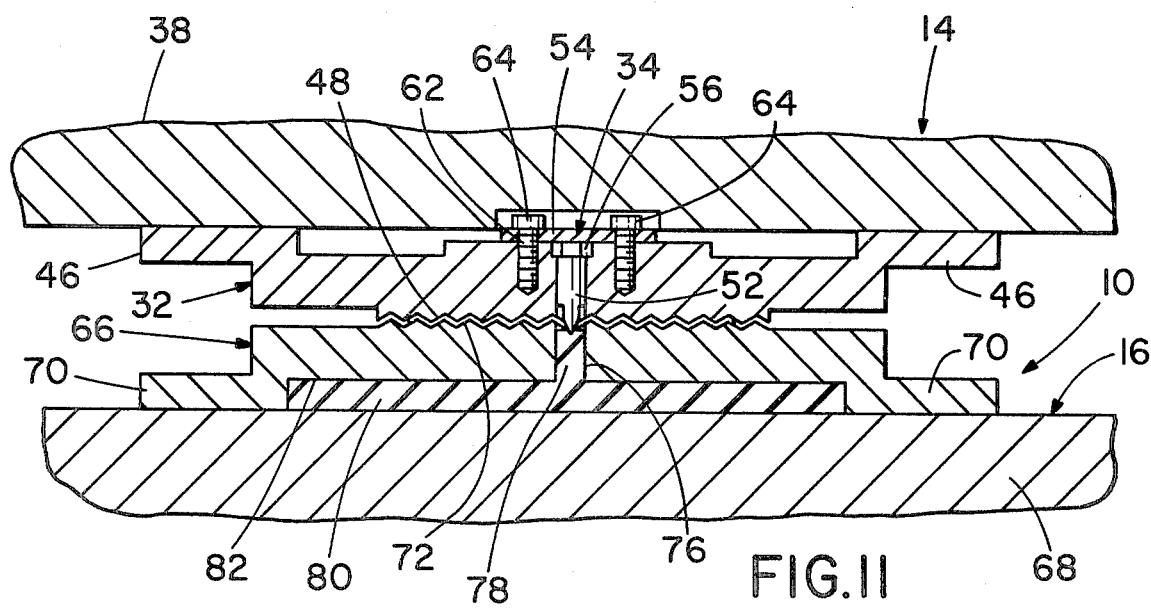
FIG. 11 is an enlarged sectional view taken along line 11—11 of FIG. 10 particularly illustrating the slitting of the outer edges of the package illustrated in FIG. 2A.

The back-up member 78, as seen best in FIGS. 7, 9 and 11, includes a lower flange 80 which is received within a cavity 82, of the same size and shape as the flange, in the block 66 of the lower roller 68. The back-up member 78 includes a central section 84 which is sized and shaped to be received within the depression 76 in the block 66. The central section 84 includes an elevated upper surface 86 which, as seen best in FIG. 10, holds the film of the strip S in place during the slitting operation. The central section 84 further includes a slot 88 which is contiguous with the slots 74 in the block 66 in order to permit the movement of the severing blade 36 therein.

For more full understanding of the operation of the present invention, reference is particularly directed to FIGS. 10 and 11, which illustrate a tubular strip A being fed to the nip 24 defined between a pair of cooperating blocks 32 and 66 on the upper roller 38 and the lower roller 68, respectively. The blocks 44 and 66 are heated so as to provide a suitable heat sealing of the strip S and to define sealed end portions E. Substantially simultaneously with the formation of the sealed end portions E, the cam activated cutting blades 36 cut the strip transversely in order to form the individual packages P. Again, substantially simultaneously with the sealing and crimping by the crimper blocks 44 and 66 and substantially simultaneously with the transverse severing by the cutting blade 36 in order to separate the strip S into separate packages P, the slitter blades 52 slit the end portions E so as to sever it through the outer edge thereof and form the slit S' illustrated best in FIGS. 1 and 2A of the package P. The back-up member 78 supports the film S as the slitter members 52 form the slits S'. Thereafter, the separated, severed, crimped, and heat sealed and slit packages P are carried by the conveyor 18 for further packaging.

The slitters 52 cut through the outer edge of the end portion E, but only cut partially into the end portions E as it is extremely important that the slitters 52 do not penetrate the interior of the package P which could adversely affect the freshness of the product. The slits S' provide for ease of opening of the package P by the consumer, thereby solving a problem found with certain packages made of polypropylene film.

While in the foregoing there has been provided a detailed description of a particular embodiment of the present invention, it is to be understood that all equivalents obvious to those having skill in the art are to be included within the scope of the invention, as claimed.

What we claim and desire to secure by Letters Patent is:

1. In an improved assembly for dividing a continuous tubular film strip containing a plurality of longitudinally spaced articles into a plurality of individual sealed packages containing a selected number of said articles, said assembly being of the type which includes a first roller member, a second roller member mounted in cooperative relationship with said first roller member, cooperating means carried by both said first and second roller members for sealing and transversely severing said tubular strip at preselected intervals for forming said packages containing said articles, each of said packages including sealed end portions having outer edges, an improvement in said assembly comprising, in combination, slitter means mounted on said sealing and severing means carried by said first roller member for slitting said end portion, means on said sealing and severing means carried by said second roller member for holding said end portion while said slitter means cuts said end portions, said slitter means and said holding means being constructed and arranged to form at least one slit in at least one of said sealed end portions of each of said packages, said slitter means being positioned on said sealing and severing means for forming said slit substantially simultaneously with said sealing and severing of said tubular strip when forming said packages, said slit being in a direction transverse to and through one of said edges and being spaced from and not penetrating the interior of said package.

2. The assembly of claim 1 wherein said sealing and severing means includes rigid heated members mounted on each of said roller members for crimping and heat sealing said end portions and said severing means includes a cam operated cutter carried on said first roller member in position on said slitting and severing means.

3. The assembly of claim 2 wherein said slitter means comprises a blade positioned on said rigid member on one side of said cutter member.

4. The improved assembly of claim 3 wherein a slitter means is mounted on each side of said cutter member.

5. The assembly of claim 3 wherein said holding means includes back-up means in said slitting and severing means carried on said second roller member which registers with said slitter means.

* * * * *